(12) United States Patent
Ringal

(10) Patent No.: US 10,337,612 B2
(45) Date of Patent: Jul. 2, 2019

(54) METHOD AND DEVICE FOR GEAR SHIFT ASSISTANCE

(71) Applicant: AUDI AG, Ingolstadt (DE)

(72) Inventor: Johann Ringal, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 250 days.

(21) Appl. No.: 15/126,733

(22) PCT Filed: Sep. 1, 2015

(86) PCT No.: PCT/EP2015/001763
§ 371 (c)(1),
(2) Date: Sep. 16, 2016

(87) PCT Pub. No.: WO2016/034281
PCT Pub. Date: Mar. 10, 2016

(65) Prior Publication Data
US 2018/0172156 A1  Jun. 21, 2018

(30) Foreign Application Priority Data
Sep. 5, 2014 (DE) .................. 10 2014 013 183

(51) Int. Cl.
*F16H 63/42* (2006.01)
*B60W 50/14* (2012.01)
(Continued)

(52) U.S. Cl.
CPC ............. *F16H 63/42* (2013.01); *B60W 50/14* (2013.01); *F16H 61/0403* (2013.01);
(Continued)

(58) Field of Classification Search
None
See application file for complete search history.

(56) References Cited

U.S. PATENT DOCUMENTS

2005/0261819 A1* 11/2005 Mepham ............. B60R 16/0232
701/70
2009/0233762 A1  9/2009 Choby
(Continued)

FOREIGN PATENT DOCUMENTS

CN    102529974    7/2012
CN    102795224    11/2012
(Continued)

OTHER PUBLICATIONS

English translation of International Preliminary Report on Patentability dated Mar. 16, 2017 from International Patent Application No. PCT/EP2015/001763, 7 pages.
(Continued)

*Primary Examiner* — Colby M Hansen
(74) *Attorney, Agent, or Firm* — Staas & Halsey LLP

(57) ABSTRACT

A gear selection recommendation can be displayed in a vehicle having a transmission to be actuated manually. The gear selection recommendation can be calculated based on a present deceleration setpoint value to be ascertained by a control unit. A gear suitable for generating an engine braking force corresponding to the present deceleration setpoint value is calculated and the calculated gear is displayed as the gear selection recommendation on a display unit included in the vehicle.

15 Claims, 2 Drawing Sheets

(51) Int. Cl.
  *F16H 61/04*  (2006.01)
  *F16H 61/21*  (2006.01)
  *F16H 61/02*  (2006.01)

(52) U.S. Cl.
  CPC .... *F16H 61/21* (2013.01); *B60Y 2300/18083* (2013.01); *F16H 2061/0237* (2013.01); *F16H 2063/426* (2013.01); *F16H 2306/54* (2013.01)

(56) References Cited

U.S. PATENT DOCUMENTS

2010/0106383 A1* 4/2010 Poisson ............... F16H 61/21
  701/60
2015/0364045 A1* 12/2015 Lissajoux ............ G08G 5/0021
  701/3

FOREIGN PATENT DOCUMENTS

| CN | 104011435 | 8/2014 |
|---|---|---|
| DE | 102 10 545 A1 | 9/2003 |
| DE | 10 2005 045 049 A1 | 3/2007 |
| DE | 10 2009 024 528 A1 | 3/2010 |
| DE | 10 2010 003 673 A1 | 10/2011 |
| DE | 10 2010 041 539 A1 | 3/2012 |
| DE | 10 2011 113 491 A1 | 3/2012 |
| DE | 10 2010 048 323 A1 | 4/2012 |
| DE | 10 2011 007 034 A1 | 10/2012 |
| DE | 10 2011 102 435 A1 | 11/2012 |
| DE | 10 2011 103 722 A1 | 12/2012 |
| DE | 10 2011 121 476 A1 | 6/2013 |
| DE | 10 2014 013 183.1 | 9/2014 |
| EP | 1 790 946 A2 | 5/2007 |
| EP | 1 860 354 | 11/2007 |
| JP | 58-200839 | 11/1983 |
| WO | PCT/EP2015/001763 | 9/2015 |

OTHER PUBLICATIONS

Chinese Office Action dated Feb. 23, 2018 from Chinese Patent Application No. 201580011333.7, 5 pages.
German Office Action dated Jun. 25, 2015 from German Patent Application No. 10 2014 013 183.1, 6 pages.
International Search Report dated Nov. 24, 2015 from International Patent Application No. PCT/EP2015/001763, 6 pages.

* cited by examiner

METHOD AND DEVICE FOR GEAR SHIFT ASSISTANCE

CROSS REFERENCE TO RELATED APPLICATIONS

This application is a U.S. national stage of International Application No. PCT/EP2015/001763, filed on Sep. 1, 2015. The International Application claims the priority benefit of German Application No. 10 2014 013 183.1, filed on Sep. 5, 2014. Both the International Application and German Application are incorporated by reference herein in their entirety.

BACKGROUND

Described herein is a method for displaying and calculating a gear shift recommendation for a transmission to be shifted manually in a vehicle. In addition, described herein is a vehicle for carrying out the method.

A force which is generated by an engine, for example an internal combustion engine, is generally converted via a transmission and relayed to wheels of a vehicle, for example, to thus drive the vehicle. By selecting a suitable transmission ratio by way of a suitable gear in a transmission, an efficiency of the engine can be acted upon.

Since increased engine speeds occur at lower gears in relation to higher gears, lower gears also cause an increased friction force of respective components, for example, pistons and/or shafts, which have to be overcome by a respective engine for propulsion operation. Such friction forces can furthermore be used to absorb and/or dissipate movement energy of a respective vehicle. The movement energy applied by a respective vehicle can pass from the wheels of a respective vehicle to the transmission and, as a result, to the engine of the vehicle and can cause a movement of respective components therein, for example, gearwheels, shafts, or pistons. The respective components are sometimes subjected in this case to substantial friction forces, which in turn result in the dissipation and/or conversion of the movement energy, which acts on the respective components, into heat, for example.

Targeted dissipation and/or targeted conversion of movement energy into heat is known under the term "engine brake". When traveling using an engine brake, for example, an acceleration energy, which acts on a vehicle due to a gradient, can be reduced or even compensated for, so that the vehicle does not experience acceleration or even decelerates on the slope, without brake systems, for example, friction brakes, having to be used.

SUMMARY

A selection of an optimum gear is dependent on various factors, for example, vehicle weight, present grade, or engine size. Devices and methods are described in the related art for assisting a driver of a vehicle during a selection of an optimum gear.

German published application DE 10 2011 121 476 A1 describes a method for operating a manual shift transmission in a vehicle, in which, if no gear is engaged in a transmission, it is recognized that a gear should be engaged.

A method for indicating a gear change recommendation is described in German published application DE 10 2011 013 722 A1. The German document describes that the gear change recommendation is performed as a function of a size of a difference between an expected acceleration and an actual acceleration.

A method is described in German published application DE 10 2011 113 491 A1, in which a shift time recommendation is spontaneously adapted on the basis of at least one vehicle parameter.

Against this background, a method for displaying and calculating a gear selection recommendation in a vehicle having a transmission to be actuated manually is described herein, in which, on the basis of a present deceleration setpoint value to be ascertained by a control unit, a gear suitable for generating an engine braking force corresponding to the present deceleration setpoint value is calculated and the calculated gear is displayed as a gear selection recommendation on a display unit, which is included in the vehicle.

The method described herein is used in particular for displaying a gear selection recommendation to a driver of a vehicle on a display unit, so that the driver can select the corresponding gear and the vehicle can accordingly be moved optimally.

A deceleration setpoint value is to be understood in the context of the method described herein as a value which estimates a force which is required for a desired or necessary deceleration of a respective vehicle. By using the deceleration setpoint value, a deceleration value, i.e., a braking force, which has to be applied by a friction brake and/or an engine brake for a specific driving maneuver, can be indicated.

Numerous parameters are to be considered to calculate a gear suitable for a present deceleration setpoint value. Inter alia, the present deceleration setpoint value has to be ascertained. For this purpose, for example, a control unit of the respective vehicle can ascertain or determine the present deceleration setpoint value in that the control unit ascertains, for example, a route to be traveled on the basis of navigation data and identifies potential deceleration-relevant points, compares them to a present velocity of the vehicle, and calculates a deceleration energy, which is required for a necessary and/or prescribed velocity at a closest deceleration-relevant point, and on the basis of which the deceleration setpoint value may be determined.

To decelerate the respective vehicle to a specific velocity proceeding from a present velocity, the control unit of the vehicle calculates, on the basis of predefined parameters, for example, an engine coefficient of friction and/or a temperature-dependent engine friction characteristic map, how much energy can be absorbed and/or dissipated by the engine at a specific speed. On the basis of knowledge about how much energy the engine can presently absorb and/or dissipate, it is possible for the control unit to ascertain a speed matching with a respective deceleration setpoint value and a corresponding gear for a known route in the case of, for example, a known gradient. For this purpose, in particular a duration is calculated, for which a lower gear has to be used for driving, to dissipate a specific amount of energy.

As soon as the control unit has calculated a respective optimum and/or suitable gear, a gear selection recommendation can be provided to the driver on a display unit, for example, a TFT, LCD, or LED display screen or any further device which is technically suitable for displaying items of information. In particular, it is conceivable that a signal tone or a so-called "shift flash" is presented to the driver for up shifting or downshifting, respectively.

By way of a selection of a gear by a driver corresponding to a respective gear selection recommendation, the respective vehicle can be moved in a consumption-optimized and/or wear-optimized manner, since unnecessary acceleration and/or deceleration using a friction brake, for example, a disk brake can be avoided.

In particular in trucks, which provide a variety of gears and/or transmission ratios, an assistance to the driver in the selection of the correct gear suggests itself. For this purpose, the driver can optionally provide further items of information for the calculation of the desired gear, for example, desired arrival time, desired consumption mode, or material protection behavior and/or can select them from a selection menu displayed by the control unit.

In addition to an optimized deceleration performance, an optimized fuel consumption by way of an optimized gear selection and/or an optimized gear selection recommendation is also conceivable. By way of a selection of, for example, a neutral gear, i.e., an idle, or a high gear, i.e., a gear having a high transmission ratio, a respective vehicle can maintain movement energy which is already built up in a particularly efficient manner. This means that by knowing about, for example, a future route profile and/or a future vehicle situation, i.e., for example, about road and/or traffic conditions, action can be taken on the vehicle early, so that the vehicle is decelerated in a consumption-optimized and/or wear-optimized manner and/or is moved in a consumption-optimized and/or wear-optimized manner to a specific route section.

In an embodiment of the method described herein, it is provided that respective present route data is provided by a navigation device.

To calculate a suitable gear for travel on a respective road, items of information are necessary about the route to be traveled, since the deceleration setpoint value is directed to respective traffic and/or environmental conditions, i.e., it is ascertained as a function of a present environment, for example, height differences and/or a traffic situation of the route to be traveled. This means that, for example, in the event of a strong gradient to be expected, a high deceleration setpoint value is ascertained, so that a lower gear would be recommended, and in the event of a level route to be expected, for example, a phase in idle is ascertained.

Navigation devices offer detailed items of information about a respective route to be traveled, so that an information supply from, for example, a digital roadmap and/or an information ascertainment by, for example, a control unit by a digital roadmap is suitable for ascertaining the respective deceleration setpoint value. It is therefore provided that items of route and/or environmental information are ascertained from a digital map in a defined region, which can be determined by the driver, for example.

On the basis of items of route information, inter alia, items of information about a potential movement energy, which is transferred to the respective vehicle, can be calculated when the vehicle travels on a respective route. To ascertain a respective present deceleration setpoint value, the items of route information can be provided to the control unit of the respective vehicle or can be ascertained by the control unit by access to a respective digital roadmap. As a function of the potential movement energy transferred to the vehicle, a deceleration setpoint value can be ascertained, which takes into consideration, for example, the range determined by the driver of, for example, 500 m, 1000 m, or any suitable distance for calculating potential energy acting on the vehicle.

It is furthermore possible that the range of items of route information on the digital roadmap is dynamically adapted as a function of a present velocity, so that a greater range is automatically selected in the case of a high velocity and a correspondingly smaller range in the case of a low velocity.

In an embodiment of the method described herein, it is provided that the deceleration setpoint value is ascertained as a function of a present situation of the vehicle.

A present situation of a vehicle is to be understood in the context of the disclosure as a state of the vehicle, for example, a wear state and/or an interaction with an environment due to, for example, environmental or traffic influences.

Since the present situation of a respective vehicle, independently of a respective route to be traveled, can have an effect on the present deceleration setpoint value, it is provided that the present situation of the vehicle is determined by the central control unit and is possibly used in the calculation of the suitable gear.

In an embodiment of the method described herein, it is provided that the suitable gear is ascertained as a function of at least one vehicle parameter of the following list of vehicle parameters: present vehicle velocity, present parameter of a friction in an engine of the vehicle, and present deceleration value of a friction brake of the vehicle.

To assist a braking procedure by a friction brake, for example, it is possible that a deceleration value generated by the friction brake and/or a deceleration energy generated by the friction brake is used in the calculation of the suitable gear. Since the velocity of a respective vehicle changes strongly upon use of a friction brake, the deceleration energy is used in the calculation of the suitable gear, to avoid an incorrect gear selection recommendation. Furthermore, it is conceivable that, to avoid an incorrect gear selection recommendation on the basis of a variable deceleration value of a friction brake, a warning is output to the driver that a use of the friction brake in addition to a suitable gear selection can result in an inaccurate deceleration and therefore reduced consumption optimization and/or wear optimization.

In an embodiment of the method described herein, it is provided that, as a function of a present velocity setpoint value to be ascertained by the control unit, a duration suitable for an optimized fuel consumption is calculated for travel in a neutral gear and displayed on the display unit.

To use items of route information and/or the equivalents thereof in a present environment of a respective vehicle as a potential energy source for moving the vehicle, it is provided in an embodiment that, on the basis of respective items of route information, in particular on the basis of items of information on inclines and/or gradients, travel which lasts as long as possible in a neutral gear, i.e., in idle, is calculated, without falling below a predefined time and/or velocity limit, predefined by, for example, a velocity setpoint value, and/or without the vehicle traveling slower than predefined by the velocity setpoint value. This means that, for example, in the event of a long slight gradient, a gear selection recommendation to shift into idle is given to the driver, so that the vehicle does not have to drive itself, but rather is accelerated by a downhill force which is applied on the gradient. To come to a standstill again after traveling in idle, for example, at a stop sign, with the least possible wear, at a specific point on the travel along the gradient, a gear selection recommendation to shift into a low gear can be performed, to use corresponding friction forces in the engine of the vehicle to dissipate and/or absorb the movement energy of the vehicle provided by the downhill force and thus to decelerate the vehicle.

A velocity setpoint value is to be understood in the context of the method described herein as a value of a velocity which is not to be fallen below in the case of a predefined trip duration and/or arrival time or an operating mode to be selected of a respective vehicle. The velocity setpoint value can be predefined by the driver of the respective vehicle or ascertained by a control unit, for example. Of course, a respective vehicle, independently of a present gear selection recommendation, can be brought to a standstill at any time, for example, in a hazardous situation using, for example, a friction brake.

In an embodiment of the method described herein, it is provided that an engine speed to be expected upon a use of a respective suitable gear is ascertained by the central control unit and wherein, for the case in which the engine speed to be expected is greater than a limiting value to be predefined, a present engine speed is adapted to the engine speed to be expected before an engagement procedure during a corresponding gear selection.

Since a speed increase of the engine of the respective vehicle occurs in the event of a shift procedure into a lower gear than a present gear, increased friction forces arise in relation to present operation, which decelerate the vehicle and result in a jerk perceptible to respective occupants of the vehicle and/or in perceptible forces in the interior of the vehicle. To prevent a sudden effect of the forces on the interior and/or the occupants of the vehicle and to enable smooth deceleration of the vehicle, it is provided in an embodiment of the method described herein that before an engagement during a manual gear selection in a lower gear, the speed of the engine is increased, i.e., it is adapted to a speed of the engine to be expected at a present velocity of the vehicle, so that the forces acting on the occupants are minimized and/or are distributed over a longer period of time and no perceptible jerk goes through the vehicle.

It is furthermore possible that the increase of the speed of the engine before an engagement only occurs if a difference between present speed and speed to be expected during operation in the respective lower gear exceeds a predefined limiting value.

Furthermore, described herein is a vehicle having at least one control unit and at least one display unit, wherein the control unit is configured to ascertain a present deceleration setpoint value and to calculate a gear suitable for the present deceleration setpoint value and to display the calculated suitable gear as a gear selection recommendation on the at least one display unit.

The method described herein is used in particular for operating the vehicle.

The vehicle described herein can be embodied as a passenger automobile, truck, motorcycle, or any further vehicle. In particular in the case of trucks, which cause high deceleration values as a result of a high total weight, brakes of a respective truck are strongly loaded, so that the method described herein can contribute to relieving the brakes.

The vehicle described herein relieves its driver by way of assistance in the gear selection and can thus prepare the driver for possibly existing hazardous situations, for example, stop signs concealed behind a hilltop or a curve, so that strong and material-straining braking can be avoided. The vehicle can establish a connection to a server or further vehicles, for example, by way of an interface, for example, a car-to-X interface, to ascertain present traffic conditions existing on a route if necessary and to adapt the gear selection recommendation accordingly.

Further advantages and embodiments result from the description and the appended drawings.

It is apparent that the above-mentioned features and the features to be explained hereafter are usable not only in the respective specified combination, but rather also in other combinations or alone, without departing from the scope of the disclosure.

BRIEF DESCRIPTION OF THE DRAWINGS

The method and vehicle which implements the method are is illustrated on the basis of example embodiments in the drawings and will be described in detail with reference to the drawings. These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1:
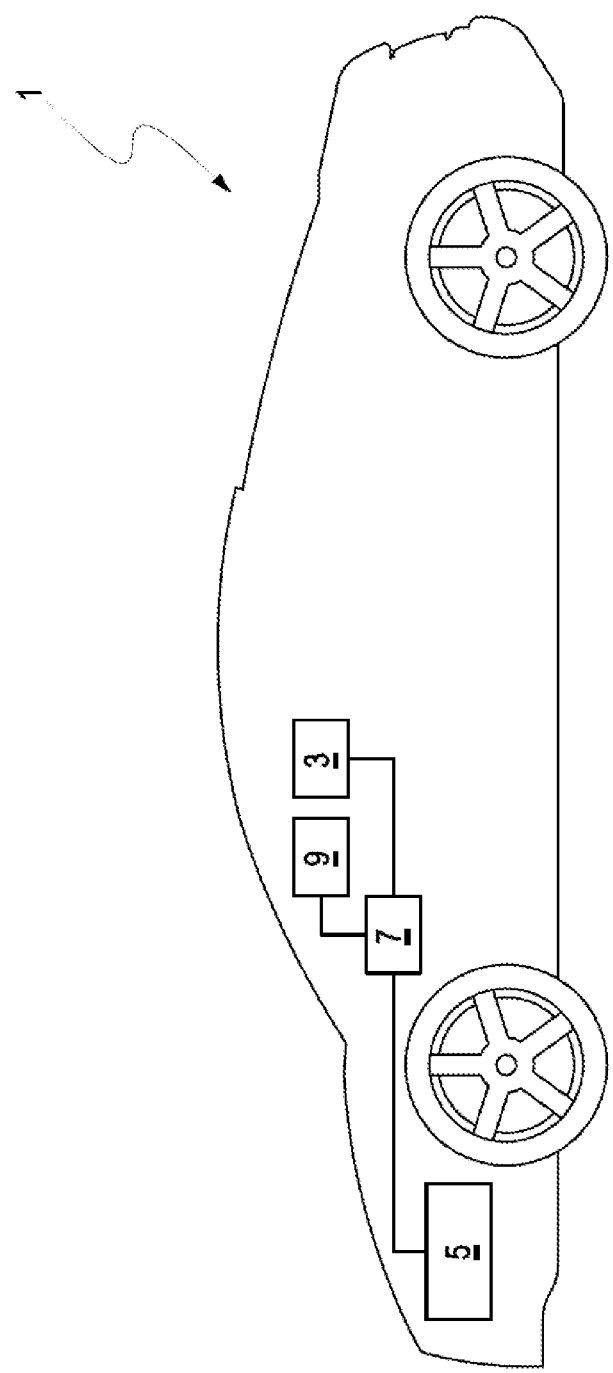
FIG. 1 illustrates a vehicle that can implement the method described herein.

Reference will now be made in detail to the preferred embodiments, examples of which are illustrated in the accompanying drawings, wherein like reference numerals refer to like elements throughout.

Referring to the drawings, FIG. 1 illustrates a vehicle 1, which is controlled by a driver on a route provided by a navigation system 3, and may include an engine 5, a central control unit 7, and a display unit 9.

To display a gear selection recommendation matching with a present situation of the vehicle 1 on the route to the driver on the display unit 9, it is provided that the central control unit 7 requests items of information about the route from the navigation system 3, i.e., for example, downloads them, and calculates, on the basis of the requested items of information, a deceleration setpoint value, which is used to calculate an optimum gear for the present situation of the vehicle 1 on the route. On the basis of the items of information requested by the navigation system 3, the central control unit 7 calculates a potential acceleration force acting on the vehicle 1 due to an environment on the route and a braking or deceleration force required to compensate for the acceleration force. On the basis of a coefficient of friction stored in the central control unit 7, which can change, for example, on the basis of a temperature-dependent characteristic map of the engine 5, the central control unit 7 calculates a speed of the engine 5 required to generate the braking force and a corresponding gear.

Since the required braking force can optionally be built up preventively over a specific route, the central control unit 7 furthermore calculates an ideal time for engaging the corresponding gear and/or for applying the braking force caused by the gear. For this purpose, the central control unit 7 ascertains, on the basis of the items of information requested by the navigation system 3, respective deceleration-relevant points on the route, for example, stop signs, and outputs a corresponding gear selection recommendation on the display unit 9, so that the vehicle 1, while using an engine brake, arrives having a corresponding velocity and/or braked at a respective deceleration-relevant point.

To increase a fuel efficiency of the vehicle 1, it is furthermore provided that the vehicle 1 ascertains, if a present deceleration setpoint value is zero, whether the vehicle 1 can maintain a present velocity and/or a present travel time in the case of operation in idle, i.e., without active propulsion by a drive force generated by the engine 5.

If the vehicle 1, for example, as a result of a gradient on a presently traveled part of the route, can maintain its present velocity even without a drive force generated by the engine 5, it is provided that the central control unit 7 outputs a gear selection recommendation to shift into idle, so that the engine 5 is not operated unnecessarily and accordingly consumes less fuel.

Figure 2:
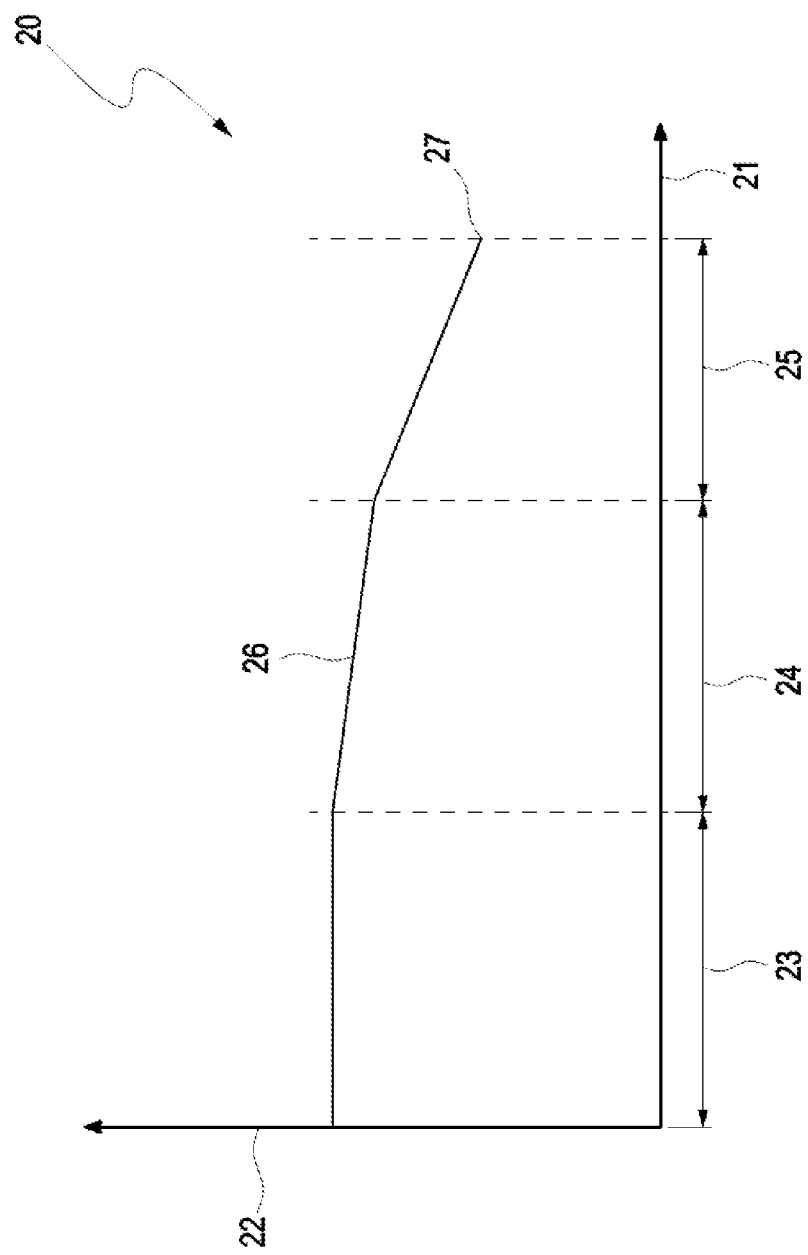
FIG. 2 illustrates a velocity curve of a vehicle in an embodiment using a coasting operation.

FIG. 2 shows a graph 20, which depicts a passed time on an abscissa 21 and a corresponding velocity of a respective vehicle on an ordinate 22.

A velocity curve 26 of the vehicle is divided here into three phases, namely a drive phase, as indicated by arrow 23, a coasting phase, as indicated by arrow 24, and a deceleration phase, as indicated by arrow 25.

The velocity curve 26 illustrates how a vehicle can be moved efficiently using coasting operation, i.e., a phase without drive and in an idle and/or free running. In the velocity curve 26 shown in the graph 20, the vehicle is only driven actively in the drive phase, which is shown by the arrow 23, i.e., driven using engine force and accordingly only consumes fuel for locomotion in this phase.

To operate the vehicle efficiently, it is provided that for the case in which a delay-relevant point 27 is to be expected on a route to be traveled, for example, according to an item of information from a navigation device, a gear selection recommendation for idle is output, so that the vehicle, efficiently, without applying drive energy and without being decelerated by friction of an engine of the vehicle, quasi-"coasts" during the coasting phase shown by the arrow 24.

To finally prepare the vehicle for the delay-relevant point 27, it is provided that a corresponding gear selection recommendation is output, which causes a respective required friction energy by the engine and/or drive components of the vehicle, so that the vehicle decelerates and arrives having a defined velocity at the delay-relevant point 27, as is apparent due to a drop of the velocity curve 26 in the deceleration phase, which is shown by the arrow 25, in the graph 20.

Furthermore, it is conceivable that the vehicle is periodically moved alternately in idle and using engine force, i.e., in coasting phases and drive phases. For this purpose, it is provided that a central control unit of the vehicle calculates an optimum ratio of idle phases and drive phases for a predefined average velocity, which can be predefined, for example, by a travel time or respective route conditions, and outputs corresponding gear selection recommendations on a display unit which the vehicle includes.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for displaying and determining a gear selection recommendation in a vehicle having a transmission operated manually, the method comprising:
   determining, by a controller, a suitable gear for generating an engine braking force corresponding to a current deceleration setpoint value;
   determining, by the controller, a duration, during which the suitable gear has to be traveled to dissipate an energy corresponding to the current deceleration setpoint value;
   displaying the suitable gear as the gear selection recommendation on a display of the vehicle; and
   displaying the duration during which the suitable gear has to be traveled to dissipate the energy corresponding to the current deceleration setpoint value on the display of the vehicle.

2. The method as claimed in claim 1, further comprising determining the current deceleration setpoint value based on route data of a route to be traveled.

3. The method as claimed in claim 2, further comprising providing, by a navigation device, the route data.

4. The method as claimed in claim 1, further comprising determining the current deceleration setpoint value based on a current status of the vehicle.

5. The method as claimed in claim 1, wherein the determining the suitable gear is based on at least one vehicle parameter, the at least one vehicle parameter including at least one of a current vehicle velocity, current parameter of friction in an engine of the vehicle, and a current deceleration value of a friction brake of the vehicle.

6. The method as claimed in claim 1, wherein the suitable gear is determined such that the vehicle is operated in a consumption-optimized manner.

7. The method as claimed in claim 1, further comprising:
   determining, by the controller, an engine speed to be expected upon a use of the suitable gear, and
   wherein, when the engine speed to be expected is greater than a predefined limiting value, a current engine speed is adapted to the engine speed to be expected before an engagement procedure during a corresponding gear selection.

8. A method for displaying and determining a gear selection recommendation in a vehicle having a transmission operated manually, the method comprising:
   determining, by a controller, a suitable gear for generating an engine braking force corresponding to a current deceleration setpoint value, such that the vehicle is operated in a consumption-optimized manner;
   determining, by the controller, a duration, during which the suitable gear has to be traveled to dissipate an energy corresponding to the current deceleration setpoint value; and
   displaying the suitable gear as the gear selection recommendation on a display of the vehicle,
   wherein a duration suitable for an optimized fuel consumption for travel in a neutral gear is determined based on a velocity setpoint value determined by the controller and is displayed on the display.

9. The method as claimed in claim 8, further comprising determining the velocity setpoint value based on an arrival time predefined by a user.

10. A vehicle, comprising:
   a chassis;
   at least one display; and
   at least one controller configured:
      to determine a current deceleration setpoint value and to determine a suitable gear for the current deceleration setpoint value,
      to determine a duration, during which the suitable gear has to be traveled to dissipate an energy corresponding to the current deceleration setpoint value,
      to control the at least one display to display the suitable gear as a gear selection recommendation, and
      to control the at least one display to display the duration during which the suitable gear has to be traveled to dissipate the energy corresponding to the current deceleration setpoint value.

11. The vehicle as claimed in claim 10, wherein
the current deceleration setpoint value is determined based on route data of a route to be traveled, and
the controller is further configured to determine an optimum ratio of idle phases and drive phases along the route to be traveled for a predefined average velocity determined based on the route.

12. The vehicle as claimed in claim 10, wherein
the controller determines as the suitable gear a gear other than an idle gear for a deceleration phase along a route to be traveled by the vehicle so that the vehicle decelerates and arrives at a predefined delay point having a predefined velocity, and
the controller controls the at least one display to display the suitable gear for the deceleration phase.

13. The vehicle as claimed in claim 12, wherein
the controller determines as another suitable gear the idle gear for a coasting phase which occurs before the deceleration phase along the route to be traveled by the vehicle so that the vehicle decelerates before the deceleration phase, and
the controller controls the at least one display to display the another suitable gear for the coasting phase.

14. The vehicle as claimed in claim 10, wherein
the controller determines a duration during which the vehicle is capable of maintaining a minimum velocity while operating in idle along a route to be traveled by the vehicle, and
the controller controls the display to display the duration.

15. A controller for a vehicle which includes a display, the controller being configured to execute one or more programs, that when executed, implement a method comprising:
determining, by the controller, a suitable gear for generating an engine braking force corresponding to a current deceleration setpoint value;
determining, by the controller, a duration, during which the suitable gear has to be traveled to dissipate an energy corresponding to the current deceleration setpoint value;
displaying the suitable gear as the gear selection recommendation on the display; and
displaying the duration during which the suitable gear has to be traveled to dissipate the energy corresponding to the current deceleration setpoint value on the display.

* * * * *